(12) United States Patent
Macgregor (10) Patent No.: US 7,676,468 B2
(45) Date of Patent: Mar. 9, 2010

(54) APPARATUS AND METHOD FOR IDENTIFYING PATTERNS IN A MULTI-DIMENSIONAL DATABASE

(75) Inventor: John Malcolm Macgregor, Ascot (GB)

(73) Assignee: Business Objects Software Ltd., Dublin (IE)

( * ) Notice: Subject to any disclaimer, the term of this patent is extended or adjusted under 35 U.S.C. 154(b) by 375 days.

(21) Appl. No.: 11/684,554

(22) Filed: Mar. 9, 2007

(65) Prior Publication Data

US 2007/0150471 A1    Jun. 28, 2007

Related U.S. Application Data

(63) Continuation of application No. 10/113,917, filed on Mar. 28, 2002, now Pat. No. 7,194,465.

(51) Int. Cl.
G06F 17/30 (2006.01)
(52) U.S. Cl. .................. 707/6; 707/100; 707/102; 707/104.1
(58) Field of Classification Search .................. 707/1–7, 707/100–104.1
See application file for complete search history.

(56) References Cited

U.S. PATENT DOCUMENTS

| 5,926,820 | A | 7/1999 | Agrawal et al. |
| 6,003,029 | A | 12/1999 | Agrawal et al. |
| 6,006,223 | A | 12/1999 | Agrawal et al. |
| 6,094,651 | A | 7/2000 | Agrawal et al. |
| 6,269,393 | B1 | 7/2001 | Yost et al. |
| 6,351,453 | B1 | 2/2002 | Nolting et al. |
| 6,542,895 | B1 | 4/2003 | DeKimpe et al. |
| 6,546,395 | B1 | 4/2003 | DeKimpe et al. |
| 6,892,208 | B2 | 5/2005 | Ashida et al. |
| 2002/0091707 | A1 | 7/2002 | Keller |
| 2002/0091908 | A1 | 7/2002 | Ashida et al. |
| 2003/0023612 | A1 | 1/2003 | Carlbom et al. |
| 2003/0101201 | A1 | 5/2003 | Saylor et al. |
| 2003/0130991 | A1* | 7/2003 | Reijerse et al. ................ 707/3 |
| 2003/0229652 | A1 | 12/2003 | Bakalask et al. |

* cited by examiner

Primary Examiner—Debbie M Le
(74) Attorney, Agent, or Firm—Cooley Godward Kronish LLP (57) ABSTRACT

An apparatus to identify patterns in a multi-dimensional database is described. In particular, a computer-readable medium to direct a computer to function in a specified manner is provided. The computer-readable medium comprises instructions to automatically identify a plurality of patterns associated with data comprising the multi-dimensional database and instructions to indicate the plurality of patterns that are identified. Exemplary patterns that can be identified include an outlier pattern, a step pattern, a random pattern, a trend pattern, and a periodic pattern.

4 Claims, 8 Drawing Sheets

APPARATUS AND METHOD FOR IDENTIFYING PATTERNS IN A MULTI-DIMENSIONAL DATABASE

BRIEF DESCRIPTION OF THE INVENTION

The present invention relates generally to computer databases. More particularly, the present invention relates to identifying patterns in a multi-dimensional database.

BACKGROUND OF THE INVENTION

On-Line Analytical Processing (OLAP) generally refers to a technique of providing fast analysis of multi-dimensional data. OLAP provides a multi-dimensional conceptual framework for data that may include support for hierarchies. This conceptual framework is advantageous since it often provides the most logical way to organize data relating to businesses or other types of organizations.

OLAP typically involves analyzing data stored in a multi-dimensional database. A multi-dimensional database may organize data in multiple dimensions and multiple fields along a given dimension. For example, a business may employ a five-dimensional database storing six months of weekly data relating to sales figures for fifty products that are sold in ten regions by five outlets. A user may be interested in identifying patterns associated with the sales figures in order to guide a decision-making process for the business. For instance. the user may be interested in identifying trends or unusual values associated with the sales figures. Even for this relatively simple five-dimensional database, 2500 separate time series may need to be analyzed. If additional fields or dimensions are included, the number of time series to be analyzed can quickly multiply.

Previous attempts for identifying patterns in a multi-dimensional database often involved a manual process, which can be tedious, time-consuming, and prone to errors or inconsistencies. While automated methods have been proposed, such methods are generally limited to exception reporting Exception reporting typically requires a standard in order to identify exceptions in data. However, this standard was not always well defined, thus limiting the significance that can be attached to an identified exception. In addition, exception reporting is limited to finding exceptions in data and, accordingly, may fail to identify or distinguish other kinds of patterns that may be of interest to a user.

It is against this background that a need arose to develop the apparatus and method described herein.

SUMMARY OF THE INVENTION

In one innovative aspect, the present invention relates to a computer-readable medium to direct a computer to function in a specified manner. In one exemplary embodiment, the computer-readable medium comprises instructions to automatically identify a plurality of patterns associated with data comprising a multi-dimensional database and instructions to indicate the plurality of patterns that are identified.

In another exemplary embodiment, the computer-readable medium comprises a pattern gallery module to define a plurality of candidate patterns for a multi-dimensional database, a pattern identification module to automatically identify a candidate pattern of the plurality of candidate patterns in the multi-dimensional database, and a user-interface module to indicate the candidate pattern that is identified.

In another innovative aspect, the present invention relates to a computer-implemented method of processing a multi-dimensional database. In one exemplary embodiment, the method comprises defining a plurality of statistical tests corresponding to a plurality of patterns, applying the plurality of statistical tests to a plurality of data vectors comprising the multi-dimensional database to identify the plurality of patterns in the multi-dimensional database, and indicating the plurality of patterns that are identified.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION

Figure 1:
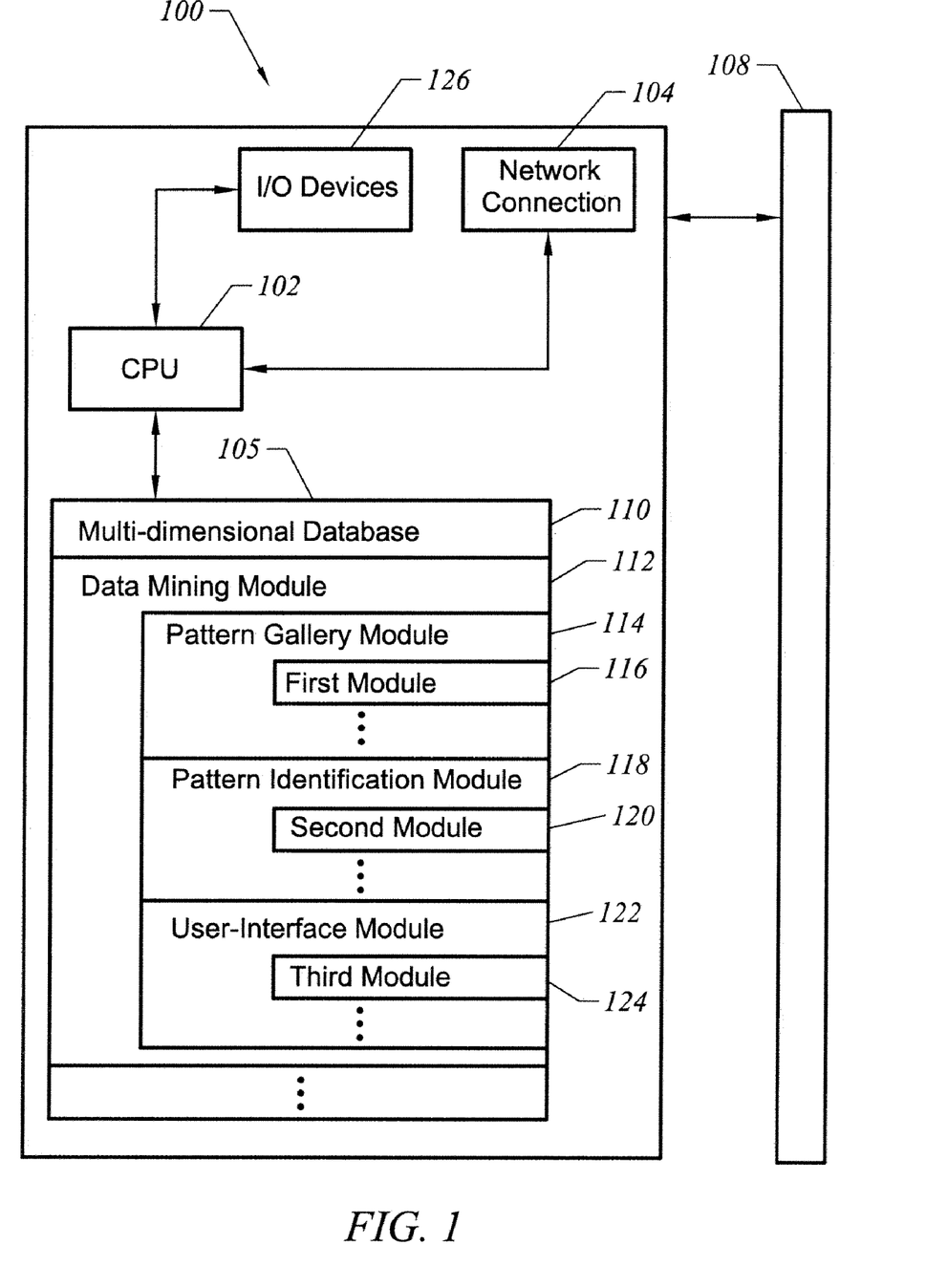
FIG. 1 illustrates a computer that may be operated in accordance with an embodiment of the invention.

FIG. 1 illustrates a computer 100 that may be operated in accordance with an embodiment of the invention. The computer 100 may be a server computer, comprising conventional server computer components, or a client computer, comprising conventional client computer components. The computer 100 may be connected to a network 108 using any wire or wireless transmission channel.

As shown in FIG. 1, the computer 100 comprises a CPU 102 connected to a set of input/output devices 126 (e.g., keyboard, mouse, video monitor, printer, etc), a network connection device 104, and a memory 106. The memory 106 stores a multi-dimensional database 110 that organizes data in two or more dimensions. In the present embodiment, the multi-dimensional database 110 may comprise one or more OLAP data cubes. The memory 106 also stores a set of computer programs that implements the processing in accordance with the present embodiment of the invention. In particular, the memory 106 stores a data mining module 112 that is configured to process data contained in the multi-dimensional database 110.

The data mining module 112 is configured to search for and to identify one or more patterns, if any, associated with data contained in the multi-dimensional database 110. In general, a pattern refers to a type of arrangement or relationship between data. More particularly, a pattern may refer to a type of arrangement or relationship between a plurality of data values, which data values may be in the form of a sequence, series, or array. For instance, a sequence of data values may exhibit an outlier pattern if at least one data value is an outlier that falls outside a probable range of variation associated with data values of the sequence. An outlier pattern may be defined in accordance with one or more statistical tests (e.g., Tukeys test or Standard Deviation test) designed to identify a sequence of data values as exhibiting such outlier pattern.

As shown in FIG. 1, the data mining module 112 comprises a plurality of modules that implement specific processing steps performed by the present embodiment of the invention. In particular, the data mining module 112 comprises a pattern gallery module 114, a pattern identification module 118, and a user-interface module 122. These modules may include one or more sub-modules. As shown in FIG. 1, the pattern gallery module 114, the pattern identification module 118, and the user-interface module 122 include a first module 116, a second module 120, and a third module 124, respectively.

The pattern gallery module 114 defines one or more patterns that can be searched for in the multi-dimensional database 110. In particular, the pattern gallery module 114 may define a plurality of patterns that may be referred to as candidate patterns for the multi-dimensional database 110. Exemplary patterns that can be defined by the pattern gallery module 114 include an outlier pattern, a step pattern, a random pattern, a trend pattern, and a periodic pattern. In the present embodiment of the invention, the pattern gallery module 114 includes the first module 116 that defines these patterns in accordance with a plurality of statistical tests. Specifically, the first module 116 may define one or more statistical tests corresponding to each pattern.

The pattern identification module 118 searches for and identifies one or more of patterns, if any, in the multi-dimensional database 110. In the present embodiment of the invention, the pattern identification module 118 includes the second module 120 that applies one or more statistical tests to data of the multi-dimensional database 110 in order to identify one or more patterns.

The user-interface module 122 indicates one or more patterns identified in the multi-dimensional database 110. The user-interface module 122 provides reports or graphs to facilitate understanding by a user. In addition to providing such reports or graphs, the user-interface module 122 allows the user to specify a variety of processing options used to identify one or more patterns. In the present embodiment of the invention, the user-interface module 122 includes the third module 124 that facilitates selecting, from the patterns defined by the pattern gallery module 114, one or more patterns to be searched for in the multi-dimensional database 110.

While the multi-dimensional database 110 and the various modules and sub-modules comprising the data mining module 112 are shown residing in the single computer 100, it should be recognized that such configuration is not required in all applications. For instance, the multi-dimensional database 110 or one or more of the modules comprising the data mining module 112 may reside in a separate computer (not shown in FIG. 1) that is connected to the network 108.

Figure 2:
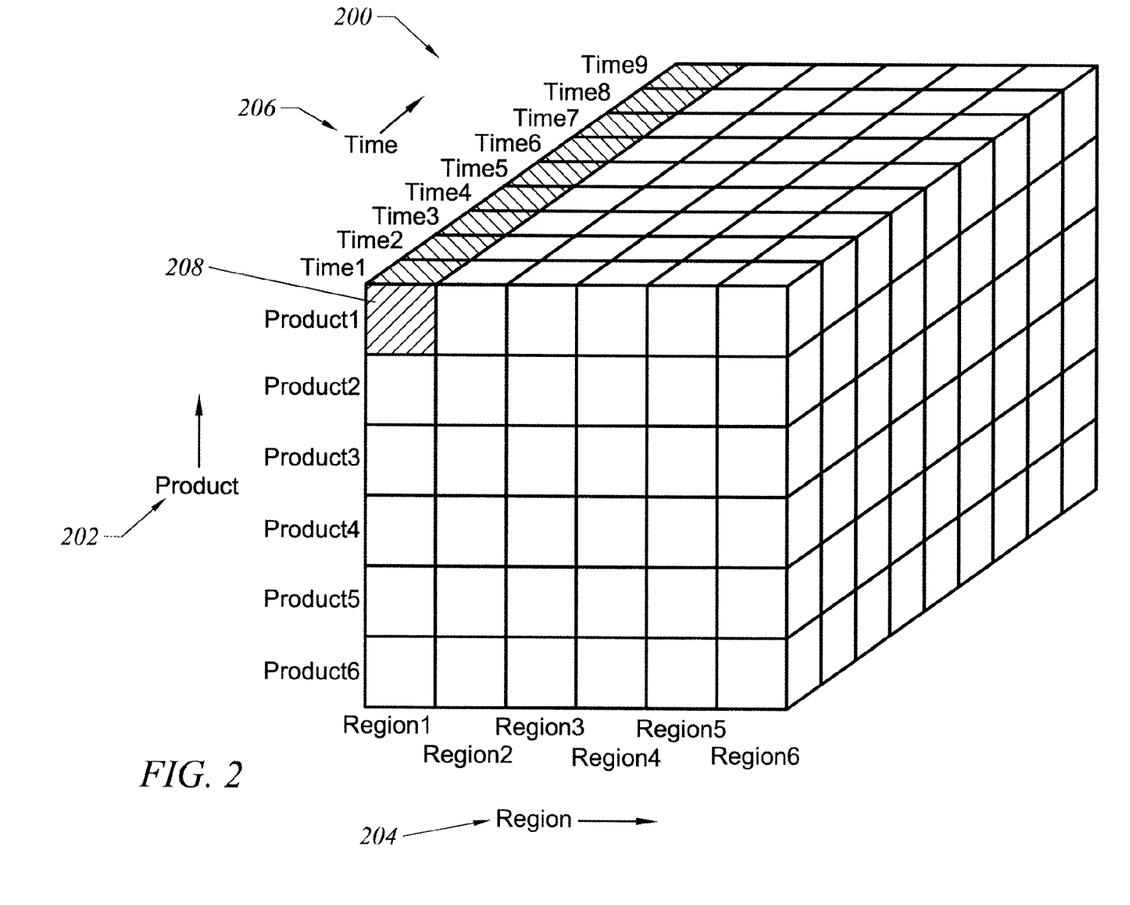
FIG. 2 illustrates an exemplary OLAP data cube that may comprise a multi-dimensional database in accordance with an embodiment of the invention.

Turning next to FIG. 2, an exemplary OLAP data cube 200 that may comprise the multi-dimensional database 110 is illustrated. Here, OLAP data cube 200 contains data relating to sales figures of various products, in various geographical regions, and at various times. In particular, OLAP data cube 200 is a four-dimensional data cube with a product dimension 202, a region dimension 204, and a time dimension 206, drawn for the single variable sales.

As shown in FIG. 2, OLAP data cube 200 may be viewed as comprising a plurality of cells (e.g., cell 208). A particular cell may contain a data value representing sales figures for a particular set of points, coordinates, or fields corresponding to the three dimensions 202, 204, and 206. Thus, for instance, the cell 208 may contain a data value representing the sales figures for product 1, in region 1, and at time 1.

A particular subset (i.e., one or more) of the data values contained in the OLAP data cube 200 may be viewed as a data vector, and the OLAP data cube 200 may comprise a plurality of data vectors corresponding to different subsets of the data values. Typically, a data vector will comprise a sequence of data values contained in a particular sequence of cells of the OLAP data cube 200. By way of example, a first data vector may comprise a sequence of data values contained in the sequence of cells shown shaded in FIG. 2. This first data vector is oriented along the time dimension 206 and comprises a sequence of data values representing sales figures for product 1, in region 1, and at various times (e.g., time 1, time 2, time 3, etc). Here, the first data vector comprises nine data values, and the length of this first data vector may be defined as nine. While the shaded cells corresponding to the first data vector are shown to be consecutive in FIG. 2, this is not required in all applications. In addition, it should be recognized that a data vector may be oriented along any one of the dimensions 202, 204, and 206 of the OLAP data cube 200. For instance, a second data vector may be oriented along the product dimension 202 and comprise a sequence of data values representing sales figures in region 1, at time 9, and for various products (e.g., product 1, product 2, product 3, etc).

While three dimensions are shown in FIG. 2, it should be recognized that more or less dimensions may be used depending on the specific application. For instance, OLAP data cube 200 may further include an outlet dimension, such that a particular cell of the OLAP data cube 200 may contain a data value representing sales figures for a particular product, in a particular region, at a particular time, and sold by a particular outlet.

The data mining module 112 may be configured to search for and to identify one or more patterns, if any, associated with data contained in the OLAP data cube 200. In the present embodiment of the invention, the data mining module 112 may automatically search for and identify one or more patterns in the OLAP data cube 200, such that a user can quickly and efficiently gain an understanding of data contained in the OLAP data cube 200. For instance, the data mining module 112 may automatically identify a trend pattern associated with sales figures for product 1 in region 1 over time. As another example, the data mining module 112 may automatically identify a periodic pattern associated with sales figures of product 2 in regions 3 and 4 over time. By facilitating such understanding of data, the data mining module 112 may serve to guide the decision-making process of the user by, for example, facilitating forecasting of future behavior of sales figures.

Figure 3:
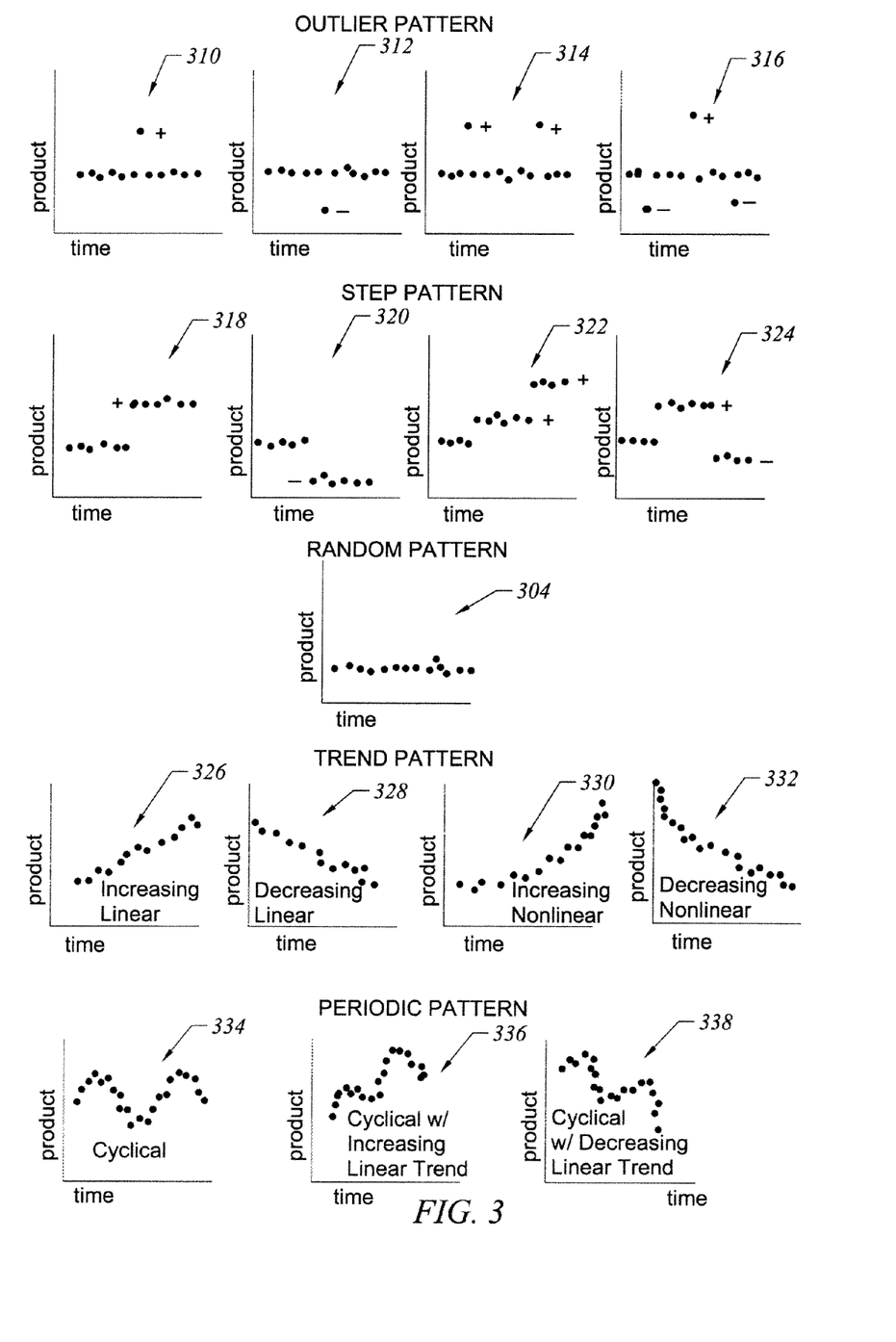
FIG. 3 illustrates various exemplary data vectors that may comprise an OLAP data cube in accordance with an embodiment of the invention.

FIG. 3 illustrates various exemplary data vectors that may comprise the OLAP data cube 200. In particular, these exemplary data vectors are shown exhibiting a variety of patterns that may be identified by the data mining module 112. Each illustrated data vector is shown comprising a sequence of data values plotted along a particular dimension of the OLAP data cube 200 (e.g., the product dimension 202 or the time dimension 206).

Data vectors 310, 312, 314, and 316 are shown exhibiting an outlier pattern. In particular, data vectors 310, 312, 314, and 316 are each shown comprising at least one outlier falling above (i.e. a "positive" outlier) or below (i.e., a "negative" outlier) a probable range of variation associated with data values comprising respective data vectors 310, 312, 314, and 316. As shown in FIG. 3, data vectors 310, 312, 314, and 316 comprise one "positive" outlier, one "negative" outlier, two "positive" outliers, and one "positive" and two "negative" outliers, respectively. For certain applications, data vectors 310, 312, 314, and 316 may be viewed as exhibiting sub-patterns grouped under an outlier pattern, and the data mining module 112 may be configured to identify one or more of these sub-patterns. Thus, for instance, the data mining module 112 may identify data vector 310 as exhibiting an outlier pattern having one "positive" outlier and data vector 312 as exhibiting an outlier pattern having one "negative" outlier. Identifying these sub-patterns may be desirable since different combinations of "positive" and/or "negative" outliers may indicate different underlying issues. By way of example, a single "positive" or "negative" outlier may indicate data error, while combinations of one or more "positive" outliers and one or more "negative" outliers may indicate randomness or data error.

Data vectors 318, 320, 322, and 324 are shown exhibiting a step pattern. In particular, data vectors 318, 320, 322, and 324 are each shown comprising at least one step. As will be later discussed, a step associated with a sequence of data values may be defined with reference to an outlier for a transformed sequence. In particular, a "positive" step in the sequence of data values will correspond to a "positive" outlier in the transformed sequence, while a "negative" step in the sequence of data values will correspond to a "negative" outlier in the transformed sequence. As shown in FIG. 3, data vectors 318, 320, 322, and 324 comprise one "positive" step, one "negative" step, two "positive" steps, and one "positive" and one "negative" step, respectively. For certain applications, data vectors 318, 320, 322, and 324 may be viewed as exhibiting sub-patterns grouped under a step pattern, and the data mining module 112 may be configured to identify one or more of these sub-patterns. Thus, for instance, the data mining module 112 may identify data vector 318 as exhibiting a step pattern having one "positive" step and data vector 320 as exhibiting a step pattern having one "negative" step. Identifying these sub-patterns may be desirable since different combinations of "positive" and/or "negative" steps may indicate different underlying issues. By way of example, a series of "positive" (or "negative") steps may indicate an emerging trend, while combinations of one or more "positive" outliers and one or more "negative" outliers may indicate randomness.

Data vector 304 is shown exhibiting a random pattern. In particular, the data values comprising data vector 304 fail to exhibit a sufficient degree of association or correlation and may be viewed as a random sequence of data values. The randomness may be a significant business issue if a positive trend was expected.

Data vectors 326, 328, 330, and 332 are shown exhibiting a trend pattern. Unlike data vector 304, data values comprising each of the data vectors 326, 328, 330, and 332 exhibit a sufficient degree of association or correlation such that a trend pattern can be identified. In particular, data vectors 326, 328, 330, and 332 are shown exhibiting an increasing linear trend, a decreasing linear trend, an increasing nonlinear trend, and a decreasing nonlinear trend, respectively. For certain applications, data vectors 326, 328, 330, and 332 may be viewed as exhibiting sub-patterns grouped under a trend pattern, and the data mining module 112 may be configured to identify one or more of these sub-patterns. Thus, for instance, the data mining module 112 may identify data vector 326 as exhibiting a trend pattern having an increasing linear trend and data vector 328 as exhibiting a trend pattern having a decreasing linear trend.

Data vectors 334, 336, and 338 are shown exhibiting a periodic pattern. In particular, data values comprising each of the data vectors 334, 336, and 338 exhibit a sufficient degree of association or correlation in the form of cyclical behavior. It should be recognized that a data vector may exhibit more than one pattern. For instance, as shown in FIG. 3, data vectors 336 and 338 each exhibit a periodic pattern in conjunction with a trend pattern. Specifically, data values comprising data vector 336 exhibit a cyclical behavior in conjunction with an increasing linear trend, and data values comprising data vector 338 exhibit a cyclical behavior in conjunction with a decreasing linear trend. The data mining module 112 may be configured to identify multiple patterns that are exhibited by a particular data vector. Thus, for instance, the data mining module 112 may identify data vector 336 as exhibiting a periodic pattern and a trend pattern.

The foregoing discussion provides a general overview of one exemplary embodiment of the invention. Attention now turns to FIG. 4 that illustrates processing steps associated with another exemplary embodiment of the invention. For ease of discussion, reference will be made below to an exemplary data vector V comprising a sequence of n data values $\{X_1 \ldots X_n\}$. Data vector V may be oriented along a T dimension of an OLAP data cube (e.g., the time dimension 206 of the (FLAP data cube 200), in which case the sequence of data values $\{X_1 \ldots X_n\}$ will correspond to a sequence of points $\{T_1 \ldots T_n\}$ along the T dimension.

Figure 4:
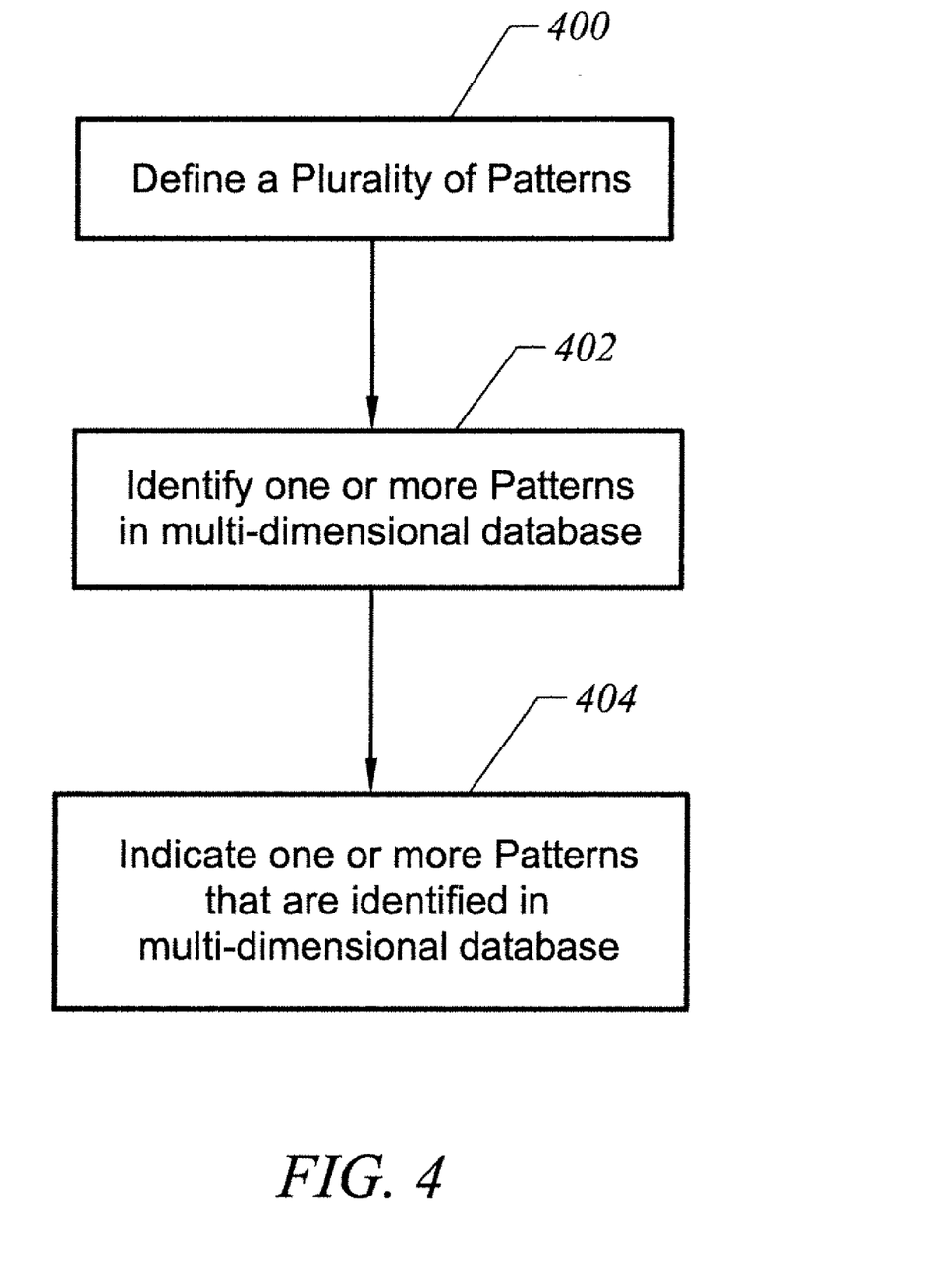
FIG. 4 illustrates processing steps that may be performed in accordance with an embodiment of the invention.

The first processing step shown in FIG. 4 is to define a plurality of patterns (step 400). In particular, a pattern gallery module (e.g., the pattern gallery module 114) may define a plurality of patterns that can be searched for in a multi-dimensional database (e.g., the multi-dimensional database 110). In the present embodiment of the invention, the pattern gallery module includes a first module (e.g., the first module 116) that defines these patterns in accordance with a plurality of statistical tests. The nature of such statistical tests for an outlier pattern, a step pattern, a random pattern, a trend pattern, and a periodic pattern is discussed as follows.

Outlier Pattern

Exemplary statistical tests to define an outlier pattern include Tukeys test (or Inter-quartile Range test) and Standard Deviation test (or Control Limits test). In accordance with these statistical tests, data vector V will be deemed to exhibit an outlier pattern if one or more data values are outliers having values falling outside a probable range of variation associated with data values of the sequence.

With reference to Tukeys test, an Inter-quartile range IQR may be defined as the difference between an upper quartile UQ (i.e., $75^{th}$ percentile) and a lower quartile LQ (i.e., 25th percentile) associated with the data values of the sequence. The upper quartile UQ has a value such that 75 percent of the data values of the sequence are smaller than or equal to the upper quartile UQ, while the lower quartile LQ has a value such that 25 percent of the data values of the sequence are smaller than or equal to the lower quartile LQ. A data value $X_i$ of the sequence may be defined as an outlier if either one of the below relations is satisfied:

$$X_i < LQ - \alpha IQR \qquad (1)$$

$$X_i > UQ + \alpha IQR \qquad (2)$$

where $IQR = UQ - LQ$ and $\alpha$ is a parameter that defines the probable range of variation (based on IQR) associated with data values of the sequence. In general, $\alpha$ may be any number greater than or equal to zero. In the present embodiment of the invention, α is an adjustable parameter and is typically set to be equal to or greater than 1 (e.g., 1.5). If the data vector V comprises a large number of data values (e.g., n greater than 36), it may be desirable, but not required, that α is set to be equal to or greater than 2 (e.g., 2 or 2.5).

In accordance with the Standard Deviation test, a data value $X_i$ of the sequence may be defined as an outlier if it lies outside a probable range of variation relative to the mean $X_{mean}$ of the data values of the sequence. In particular, a standard deviation S associated with the data values of the sequence may be defined as:

$$S = \sqrt{\frac{\sum_{j=1}^{n}(X_j - X_{mean})^2}{n-1}}. \quad (3)$$

A data value $X_i$ of the sequence may be defined as an outlier if either one of the below relations is satisfied:

$$X_i < X_{mean} - \beta S \quad (4)$$

$$X_i > X_{mean} + \beta S \quad (5)$$

where β is a parameter that defines the probable range of variation (based on S) associated with data values of the sequence. In general, β may be any number greater than or equal to zero, and, according to the present embodiment of the invention, β is an adjustable parameter that is typically set to be equal to or greater than 1 (e.g., 2 or 3).

In accordance with these statistical tests, the data value $X_i$ may be defined as a "negative" outlier if relation (1) or (4) is satisfied or as a "positive" outlier if relation (2) or (5) is satisfied. If the case of multiple outliers, various combinations of "negative" and "positive" outliers are possible. By way of example, possible combinations for a total of two outliers include one "negative" and one "positive" outlier, two "negative" outliers, and two "positive" outliers. These various combinations of one or more outliers may be defined as sub-patterns grouped under an outlier pattern.

As discussed previously, a data vector (e.g., the data vector V) may exhibit more than one pattern. For instance, the data vector V may exhibit a trend pattern (e.g., a trend pattern having a linear trend) in conjunction with an outlier pattern. If desired, the sequence of data values may be detrended (e.g., a linear trend removed), and one or more outliers may be defined for the detrended sequence of data values in accordance with either, or both, Tukeys test or the Standard Deviation test.

Step Pattern

A step pattern may be defined in accordance with an exemplary statistical test discussed as follows. The sequence of n data values comprising the data vector V may be transformed to produce a transformed sequence of data values. This transformed sequence is defined such that a step in the original sequence will yield an outlier in the transformed sequence. In particular, this transformed sequence may be defined as a sequence of n−1 data values corresponding to successive differences in the original sequence, e.g., $\{X_2-X_i, X_3-X_2, \ldots X_n-X_{n-1}\}$. In accordance with either, or both, of the statistical tests discussed above for an outlier pattern, one or more outliers may be defined for this transformed sequence that will correspond to one or more steps in the original sequence. For certain applications, a distance between a pair of successive outliers in the transformed sequence may be defined as the length of a step in the original sequence.

In a similar manner as discussed previously, an outlier for the transformed sequence may be defined as a "negative" outlier or as "positive" outlier. A "negative" outlier for the transformed sequence will correspond to a "negative" step in the original sequence, while a "positive" outlier for the transformed sequence will correspond to a "positive" step in the original sequence. If the case of multiple steps, various combinations of "negative" and "positive" steps are possible. By way of example, possible combinations for a total of two steps include one "negative" and one "positive" step, two "negative" steps, and two "positive" steps. These various combinations of one or more steps may be defined as sub-patterns grouped under a step pattern.

Random Pattern

Exemplary statistical tests to define a random pattern include Runs test, Autocorrelation test, and Mean Squared Successive Difference test. In accordance with these statistical tests, an assumption of randomness in the sequence of data values may be initially made, and data vector V will be deemed to exhibit a random pattern unless contrary evidence of non-randomness is found. In particular, evidence of non-randomness may be provided if an observed value for a particular statistical quantity falls outside a probable range of variation associated with a random sequence of data values.

In accordance with the Runs test, the number of runs R for the data vector V may be defined based on the number of crossings through a median (i.e., $50^{th}$ percentile) associated with the data values of the sequence. The median has a value such that 50 percent of the data values of the sequence are smaller than or equal to the median. Data values of the sequence may be identified based on whether the data values are greater than or smaller than the median. Thus, for instance, a particular data value may be labeled as H (for high) or L (for low) depending upon its relative magnitude compared to the median. If the number of data values n is an odd number, the median will correspond to at least one data value of the sequence. Such data value (or data values) is typically ignored and need not be labeled as H or L. By way of example, the data vector V may comprise 14 data values that are represented as {L, L, L, H, H, H, H, H, L, L, L, L, H, H} based on relative magnitudes compared to the median. A transition from H to L (or L to H) denotes a crossing, and the number of crossings determines the number of blocks of consecutive H's or L's, which number of blocks may be defined as the number of runs R. With reference to the above example, the observed or measured number of runs $R_{obs}$ for data vector V is 4, which corresponds to one plus the number of crossings (i.e., 3).

The data vector V will be deemed to exhibit a random pattern if the observed number of runs $R_{obs}$ falls within or at boundaries of a probable range of variation associated with a random sequence of data values. Conversely, evidence of non-randomness will be provided if the observed number of runs $R_{obs}$ falls outside this probable range of variation. Under the assumption that the sequence of n data values is a random sequence associated with a normal distribution, the expected value E(R) and variance Var(R) of the number of runs R may be approximated as:

$$E(R) \cong \frac{n}{2} + 1 \quad (6)$$

-continued $$\text{Var}(R) \cong \frac{n(n-2)}{4(n-1)}$$

In accordance with relation (6), the assumption of randomness will be rejected for the data vector V if either of the below relations is satisfied:

$$R_{obs} < E(R) - \gamma(\text{Var}(R))^{1/2} \tag{7}$$

$$R_{obs} > E(R) + \gamma(\text{Var}(R))^{1/2} \tag{8}$$

where γ is a parameter that defines the probable range of variation (based on Var(R)) of the number of runs R associated with a random sequence of n data values. In general, γ may be any number equal to or greater than zero, and, according to the present embodiment of the invention, γ is an adjustable parameter that is typically set to be equal to or greater than 1. In particular, γ may be set in accordance with a desired significance or confidence level for the Runs test. For instance, γ may be set to be 1.645 to achieve a confidence level of 90 percent (i.e., 90 percent probability encompassed by the probable range of variation defined by γ for a random sequence) or 1.96 to achieve a confidence level of 95 percent (i.e., 95 percent probability encompassed by the probable range of variation defined by γ for a random sequence).

For the Autocorrelation test, one or more autocorrelation coefficients may be defined to measure a degree of association or correlation between data values of the sequence. In particular, for the sequence of n data values $\{X_1 \ldots X_n\}$, an autocorrelation coefficient $r_k$ may be defined to measure a degree of association between data values that are k units apart from one another in accordance with the following relation:

$$r_k = \frac{\sum_{j=1}^{n-k}(X_j - X_{mean})(X_{j+k} - X_{mean})}{\sum_{j=1}^{n}(X_j - X_{mean})^2}. \tag{9}$$

The data vector V will be deemed to exhibit a random pattern if the observed or measured autocorrelation coefficient $r_{k,obs}$ falls within or at boundaries of a probable range of variation associated with a random sequence of n data values. Conversely, evidence of non-randomness will be provided if the observed autocorrelation coefficient $r_{k,obs}$ falls outside this probable range of variation. Under the assumption that the sequence of n data values is a random sequence associated with a normal distribution, the expected value $E(r_k)$ and variance $\text{Var}(r_k)$ of the autocorrelation coefficient $r_k$ may be approximated as zero and 1/n, respectively. The assumption of randomness will be rejected for the data vector V if either of the below relations is satisfied:

$$r_{k,obs} < -\delta(\text{Var}(r_k))^{1/2} \tag{10}$$

$$r_{k,obs} > +\delta(\text{Var}(r_k))^{1/2} \tag{11}$$

where δ is a parameter that defines the probable range of variation (based on Var($r_k$)) of the autocorrelation coefficient $r_k$ associated with a random sequence of n data values. In general, δ may be any number equal to or greater than zero, and, according to the present embodiment of the invention, δ is an adjustable parameter that is typically set to be equal to or greater than 1. In particular, δ may be set in accordance with a desired significance or confidence level for the Autocorrelation test (e.g., 1.645 for a confidence level of 90 percent or 1.96 for a confidence level of 95 percent).

Relations (9), (10), and (11) may be defined for different k's (e.g., for k=1 to int(n/2), where int(n/2) denotes a closest integer corresponding to n/2), and data vector V may be deemed to exhibit a random pattern if various observed autocorrelation coefficients $r_{k,obs}$'s fall within or at boundaries of the probable range of variation associated with a random sequence of n data values. Alternatively or in conjunction, a statistical quantity Q (here, a Lung-Box statistic) may be defined based on various autocorrelation coefficients $r_k$'s as follows:

$$Q = n(n-2)\sum_{k=1}^{l}\frac{r_k^2}{n-k} \tag{12}$$

where l=int(n/5), for n≦60 and l=30, for n>60. Under the assumption of a random sequence of n data values, the statistical quantity Q is distributed in accordance with a chi-square distribution with l degrees of freedom. The assumption of randomness for the data vector V will be rejected if the following relation is satisfied:

$$P(Q > Q_{obs}) < \Phi \tag{13}$$

where P( ) denotes a probability in accordance with the chi-square distribution with l degrees of freedom, $Q_{obs}$ is the observed or measured value for Q, and Φ is a parameter that, in general, may be any number in the range of zero to one. In the present embodiment of the invention, Φ is an adjustable parameter that is typically set to be equal to or less than 0.2 (e.g., 0.1). Relation (13) may be understood as follows. A greater degree of association between data values of the sequence will typically correspond to a greater value for $Q_{obs}$. This greater value for $Q_{obs}$ will in turn yield a small probability (e.g., less than 0.1) for Q greater than $Q_{obs}$, thus providing evidence for non-randomness for the sequence.

Turning next to the Mean Squared Successive Different Test, a mean squared successive difference MSSD for the sequence of data values may be defined as:

$$MSSD = \frac{1}{n-1}\sum_{j=2}^{n}(X_j - X_{j-1})^2. \tag{14}$$

A statistical quantity d for the sequence may be defined as the ratio of the mean squared successive difference MSSD and the squared standard deviation S previously defined in relation (3). In particular, d may be defined as:

$$d = \frac{MSSD}{S^2} \tag{15}$$

$$= \frac{\sum_{j=2}^{n}(X_j - X_{j-1})^2}{\sum_{j=1}^{n}(X_j - X_{mean})^2}.$$

Under the assumption that the sequence of n data values is a random sequence associated with a normal distribution. the expected value E(d) and variance Var(t) of the statistical quantity d may be approximated as:

$$E(d) \cong 2 \qquad (16)$$
$$\operatorname{Var}(d) \cong \frac{n-2}{n^2}$$

The assumption of randomness will be rejected for the data vector V if either of the below relations is satisfied:

$$d_{obs} < E(d) - \epsilon(\operatorname{Var}(d))^{1/2} \qquad (17)$$

$$d_{obs} > E(d) + \epsilon(\operatorname{Var}(d))^{1/2} \qquad (18)$$

where $\epsilon$ is a parameter that defines the probable range of variation (based on Var(d)) of the statistical parameter d associated with a random sequence of n data values, and $d_{obs}$ is the observed or measured value for the statistical quantity d. In general, $\epsilon$ may be any number equal to or greater than zero, and, according to the present embodiment of the invention, $\epsilon$ is an adjustable parameter that is typically set to be equal to or greater than 1. In particular, $\epsilon$ may be set in accordance with a desired significance or confidence level for the Mean Squared Successive Difference test (e.g., 1.645 for a confidence level of 90 percent or 1.96 for a confidence level of 95 percent).

Trend Pattern

Exemplary statistical tests to define a trend pattern include Regression Analysis and Rank Correlation test. In accordance with these statistical tests, an assumption of no significant trend may be initially made, and data vector V will be deemed to exhibit a trend pattern if contrary evidence is found. In particular, such contrary evidence (i.e., evidence of a trend) may be provided if an observed value for a particular statistical quantity falls outside a defined range.

In accordance with Linear Regression Analysis, a trend line may be defined for the data vector V comprising the sequence of data values $\{X_1 \ldots X_n\}$. As discussed previously, the data vector V may be oriented along a T dimension of an OLAP data cube, such that the sequence of data values corresponds to a sequence of points $\{T_1 \ldots T_n\}$ along the T dimension. Using the method of least squares, the trend line may be defined as:

$$X_{fit} = a + bT \qquad (19)$$

where $X_{fit}$ represents a fitted value associated with the sequence of data values. The intercept a and slope b of the trend line are given by:

$$a = X_{mean} - bT_{mean} \qquad (20)$$

$$b = \frac{\sum_{j=1}^{n} X_j T_j}{\sum_{j=1}^{n} T_j^2}$$

where $T_{mean}$ denotes the mean of the sequence of points $\{T_1 \ldots T_n\}$. The slope b may serve to indicate the direction or significance of a linear trend (e.g., an increasing linear trend for positive b, decreasing linear trend for negative b, or no significant linear trend for b close to zero).

The data vector V will be deemed to exhibit a trend pattern in accordance with relation (19) if either, or both, a goodness of fit statistical quantity $r^2$ and a statistical quantity F have observed values falling outside defined ranges. In particular, the goodness of fit statistical quantity $r^2$ may be defined as:

$$r^2 = \frac{\sum_{j=1}^{n}(X_{j,fit} - X_{mean})^2}{\sum_{j=1}^{n}(X_j - X_{mean})^2} \qquad (21)$$

where $X_{j,fit} = a + bT_j$. The goodness of fit statistical quantity $r^2$ represents the fraction of the total variation associated with the data values of the sequence accounted for by the trend line given in relation (19). The assumption of no significant trend will be rejected for the data vector V (thus providing evidence of a trend) if the below relation is satisfied:

$$r_{obs}^2 \geqq \sigma \qquad (22)$$

where $r_{obs}^2$ is the observed or measured value for $r^2$ and $\sigma$ is a parameter that, in general, may be any number in the range of zero to one. According to the present embodiment of the invention, $\sigma$ is an adjustable parameter that is typically set to be equal to or greater than 0.5 (e.g., 0.70).

The statistical quantity A may be defined as:

$$F = (n-2)\frac{\sum_{j=1}^{n}(X_{j,fit} - X_{mean})^2}{\sum_{j=1}^{n}(X_j - X_{j,fit})^2} \qquad (23)$$

and represents a ratio of the variation associated with the data values of the sequence accounted for by the trend line to the variation unaccounted for by the trend line. Under the assumption of no significant trend (e.g., a random sequence of data values), the statistical quantity F is distributed in accordance with an F distribution with 1 and (n−1) degrees of freedom. The assumption of no significant trend will be rejected for the data vector V (thus providing evidence of a trend) if the following relation is satisfied:

$$P(F > F_{obs}) < \xi \qquad (24)$$

where P( ) denotes a probability in accordance with the F distribution with 1 and n−1 degrees of freedom, $F_{obs}$ is the observed or measured value for F, and $\xi$ is a parameter that, in general, may be any number in the range of zero to one. According to the present embodiment of the invention, $\xi$ is an adjustable parameter that is typically set to be equal to or less than 0.2 (e.g., 0.1). Relation (24) may be understood as follows. The presence of a trend associated with data values of the sequence will typically correspond to a greater value for $F_{obs}$ (i.e., a larger fraction of variation accounted for by the trend line). This greater value for $F_{obs}$ will in turn yield a small probability (e.g., less than 0.1) for F greater than $F_{obs}$, thus providing evidence of a trend for the sequence.

Alternatively or in conjunction with a trend line, various types of nonlinear trend curves may be defined for the sequence of data values in accordance with Nonlinear Regression Analysis. By way of example, a nonlinear trend curve may be exponential (e.g., $X_{fit}=ab^T$), geometric (e.g., $X_{fit}=aT^b$), hyperbolic (e.g., $X_{fit}=a+b/T$), modified hyperbolic (e.g., $X_{fit}=1/(a+bT)$), rational (e.g., $X_{fit}=T/(a+bT)$), quadratic (e.g., $X_{fit}=a+bT+cT^2$), log quadratic (e.g., Log $X_{fit}=a+bT+cT^2$), or S-shaped (e.g., $X_{fit}=a/(1+(b/T)^c)$). In these examples, a, b, and c define shapes of the trend curves, and one or more of which may serve to indicate the direction or significance of a nonlinear trend. In a similar manner as with Linear Regression Analysis, the data vector V will be deemed to exhibit a trend pattern in accordance with a particular trend curve if either, or both, the goodness of fit statistical quantity $r^2$ and the statistical quantity F have observed values falling outside defined ranges. For certain applications, a particular trend curve or line will be selected for the data vector V such that relations (22) and (24) are satisfied while resulting in the best fit (e.g., largest observed value for the goodness of fit statistical quantity $r^2$, the statistical quantity F, or both), and the data vector V will be deemed to exhibit a trend pattern in accordance with the selected trend curve or line.

Another exemplary statistical test to define a trend pattern is the Rank Correlation test. A Spearman Rank Correlation coefficient $r_s$ may be defined to measure a systematic increase or decrease in the sequence of data values $\{X_1 \ldots X_n\}$ with respect to the sequence of points $\{T_1 \ldots T_n\}$. Data values of the sequence $\{X_1 \ldots X_n\}$ may be assigned ranks based on relative magnitude. Thus, for instance, a particular data value $X_i$ having the smallest magnitude may be assigned a rank of 1, while another data value $X_j$ having the second smallest magnitude may be assigned a rank of 2. In a similar manner, points of the sequence $\{T_1 \ldots T_n\}$ may be assigned ranks based on relative magnitude. If the sequence of points $\{T_1 \ldots T_n\}$ is an ordered sequence along the T dimension, each point of the sequence may be assigned a rank based on position in the sequence. Thus, the first point $T_1$ may be assigned a rank of 1, the second point $T_2$ may be assigned a rank of 2, and so forth. The Spearman Rank Correlation coefficient $r_s$ may be defined as:

$$r_s = 1 - \frac{6\sum_{j=1}^{n} D_j^2}{n(n^2-1)} \tag{25}$$

where $D_j^2$ denotes the difference between the rank of data value $X_j$ of the sequence $\{X_1 \ldots X_n\}$ and the rank of corresponding point $T_j$ of the sequence $\{T_1 \ldots T_n\}$. A greater degree of association between ranks of the two sequences typically indicates the presence of a trend and will correspond to the Spearman Rank Correlation coefficient $r_s$ having an observed or measured value close to 1 (e.g., 0.9).

A statistical quantity t may be defined based on the Spearman Rank Correlation coefficient $r_s$ as follows:

$$t = \frac{r_s^2 \sqrt{n-2}}{\sqrt{1-r_s^2}} \tag{26}$$

Under the assumption of no significant trend (e.g., a random sequence of data values), the statistical quantity t is distributed in accordance with a Student-t distribution with n–2 degrees of freedom. The assumption of no significant trend will be rejected for the data vector V (thus providing evidence for a trend) if the following relation is satisfied:

$$P(t>t_{obs})<\xi \tag{27}$$

where P( ) denotes a probability in accordance with the Student-t distribution with n–2 degrees of freedom, $t_{obs}$ is the observed or measured value for t, and $\xi$ is a parameter that, in general, may be any number in the range of zero to one. According to the present embodiment of the invention, $\xi$ is an adjustable parameter that is typically set to be equal to or less than 0.2 (e.g., 0.1). Relation (27) may be understood as follows. The presence of a trend associated with data values of the sequence will typically correspond to a greater value for $t_{obs}$. This greater value for $t_{obs}$ will in turn yield a small probability (e.g., less than 0.1) for t greater than $t_{obs}$, thus providing evidence of a trend for the sequence.

In accordance with the Rank Correlation test, the direction of a trend may be defined in accordance with a statistical quantity B defined as follows:

$$B = \sum_{j=1}^{n} (X_j - X_{mean})(T_j - T_{mean}). \tag{28}$$

The observed value for the statistical quantity B may serve to indicate the direction or significance of a trend (e.g., an increasing trend for positive $B_{obs}$, decreasing trend for negative $B_{obs}$, or no significant trend for $B_{obs}$ close to zero).

In accordance with either Regression Analysis or the Rank Correlation test, various sub-patterns grouped under a trend pattern may be defined. For instance, sub-patterns may be defined based on direction of a trend, by linearity or nonlinearity of a trend, or both. Thus, a trend pattern having an increasing linear trend may be defined, or a trend pattern having a decreasing nonlinear trend may be defined.

Periodic Pattern

An exemplary statistical test to define a periodic pattern is the Autocorrelation test discussed previously. Thus, for instance, the data vector V will be deemed to exhibit a periodic pattern if evidence of non-randomness is found based on relations (10) and (11). A period associated with a periodic pattern may be defined in accordance with a Fourier transform corresponding to the sequence of data values $\{X_1 \ldots X_n\}$. A peak of this Fourier transform may occur at a particular wavenumber w, and the period associated with the periodic pattern may be defined as:

$$period = \frac{NP}{w} \tag{29}$$

where NP is the lowest power of two that is greater than n (e.g., for n=30, NP=$2^5$ or 32). For certain applications, an averaged wavenumber $w_{avg}$ may be substituted for the wavenumber w in relation (29) to represent a weighted average of a plurality of wavenumbers at and near the peak of the Fourier transform.

With reference to FIG. 4, the next processing step shown is to identify one or more patterns in the multi-dimensional database (step 402). In particular, a pattern identification module (e.g., the pattern identification module 118) may automatically search for and identify one or more patterns, if any, in the multi-dimensional database. For certain applications, the pattern identification module may automatically search for and identify one or more sub-patterns grouped under a particular pattern. For instance, the pattern identification module may identify a trend pattern with an increasing linear trend or an outlier pattern with one "positive" outlier.

The pattern identification module 118 in the present embodiment includes a second module (e.g., the second module 120). When searching for one or more patterns (or one or more sub-patterns) in the multi-dimensional database, the second module 120 applies one or more statistical tests to data of the multi-dimensional database. As discussed previously, the multi-dimensional database may comprise one or more OLAP data cubes. One or more statistical tests corresponding to one or more patterns may be applied to data contained in all of the OLAP data cubes or to data contained in a subset of the OLAP data cubes, which subset, for example, may be established by default or selected in accordance with user input. With reference to the exemplary OLAP data cube 200 shown in FIG. 2, the second module may apply one or more statistical tests to one or more data vectors comprising the OLAP data cube 200. In conjunction with identifying one or more patterns in the OLAP data cube 200, the second module typically will identify one or more data vectors that exhibit the one or more patterns that are identified. For instance, the second module may apply a first statistical test (e.g., Tukeys test) to data vectors comprising the OLAP data cube 200 to identify at least one data vector that exhibits a first pattern (e.g., a data vector found to exhibit an outlier pattern in accordance with relation (1) or (2)). The second module also may apply a second statistical test (e.g., Runs test) to data vectors comprising the OLAP data cube 200 to identify at least one data vector that exhibits a second pattern (e.g., a data vector found to exhibit a random pattern in accordance with relation (7) or (8)).

The second module may apply one or more statistical tests to data vectors oriented along various dimensions of an OLAP data cube. With reference to the exemplary OLAP data cube 200 shown in FIG. 2, an exemplary set of search loops for the dimensions of the OLAP data cube 200 may be defined as follows:

(Search loop for all data vectors oriented along the time dimension 206) For Region 1, Region 2, Region 3, Region 4, Region 5, and Region 6 For Product 1, Product 2, Product 3, Product 4, Product 5, and Product 6 and (Search loop for all data vectors oriented along the region dimension 204) For Time 1, Time 2, Time 3, Time 4, Time 5, Time 6, Time 7, Time 8, and Time 9 For Product 1, Product 2, Product 3, Product 4, Product 5, and Product 6 and (Search loop for all data vectors oriented along the product dimension 202) For Time 1, Time 2, Time 3, Time 4, Time 5, Time 6, Time 7, Time 8, and Time 9 For Region 1, Region 2, Region 3, Region 4, Region 5, and Region 6           (30)

For certain applications, the second module may apply one or more statistical tests to a subset of data vectors comprising an OLAP data cube. In particular, it may be desirable to identify patterns for data vectors oriented along a subset of the dimensions of the OLAP data cube, which subset, for example, may be established by default or selected in accordance with user input. With reference to the exemplary OLAP data cube 200 shown in FIG. 2, patterns with respect to the time dimension 206 may be particularly relevant, and one or more statistical tests may be applied to data vectors oriented along the time dimension 206 (e.g., using the first search loop shown in relation (30)). For a data vector oriented along a particular dimension, a range of points, coordinates, or fields associated with the particular dimension may be specified (e.g., specified by a user) to define the number of data values comprising the data vector (i.e., the length of the data vector). With reference to the exemplary OLAP data cube 200 shown in FIG. 2, the second module may apply one or more statistical tests to data vectors oriented along the time dimension 206 from time 2 to time 8. It may be desirable, but not required, that a data vector comprise a sufficient number of data values (e.g., at least 6 data values) to allow a pattern to be established and to be properly identified.

As discussed previously in connection with step 400, the first module may define more than one statistical test corresponding to a particular pattern. For instance, the first module may define Tukeys test and the Standard Deviation test corresponding to an outlier pattern, and Runs test, Autocorrelation test, and Mean Squared Successive Difference test corresponding to a random pattern. If desired, the second module may apply multiple statistical tests corresponding to a particular pattern to a data vector comprising an OLAP data cube, and the data vector may be deemed to exhibit the particular pattern in accordance with any one, or all, of the statistical tests. If multiple statistical tests are defined for a particular pattern, a particular subset of the statistical tests may be a preferred, and the second module may apply this preferred subset by default when searching for the particular pattern. For instance, while both Tukeys test and the Standard Deviation test may be defined corresponding to an outlier pattern, the second module may apply Tukeys test by default. Alternatively, a particular subset of the statistical tests may be selected by a user to direct the searching of the particular pattern in the OLAP data cube.

If desired, the pattern identification module may search for each pattern (defined by the pattern gallery module) in an OLAP data cube. For instance, an outlier pattern, a step pattern, a random pattern, a trend pattern, and a periodic pattern may be defined, and the pattern identification module may search for all five patterns in the OLAP data cube. Alternatively, the pattern identification module may search for a subset of the patterns, which subset may be established by default or selected in accordance with user input. For instance, the pattern identification module may simply search for a single pattern (e.g., a trend pattern) that is of interest to a user.

When searching for multiple patterns, the pattern identification module may search for these patterns simultaneously, sequentially, or a combination thereof. For instance, the second module initially may apply a first statistical test (e.g., Tukeys test) to an OLAP data cube to search for data vectors that exhibit a first pattern (e.g., an outlier pattern). Subsequently, the second module may apply a second statistical test (e.g., Runs test) to the OLAP data cube to search for data vectors that exhibit a second pattern (e.g., a random pattern). The pattern identification module may sequentially search for multiple patterns in accordance with a search order, which search order may be established by default or selected in accordance with user input. For instance, the pattern identification module may search for an outlier pattern, a step pattern, a random pattern, a trend pattern, and a periodic pattern in the search order indicated by default.

In the present embodiment of the invention, the second module may apply statistical tests corresponding to different patterns to respective subsets of data vectors comprising an OLAP data cube. For instance, the second module may apply a first statistical test (e.g., Tukeys tests) corresponding to a first pattern (e.g., an outlier pattern) to a first subset of data vectors and a second statistical test (e.g., Runs test) corresponding to a second pattern (e.g., a random pattern) to a second subset of data vectors. The first and second subsets of data vectors may be different (e.g., non-overlapping subsets or partially overlapping subsets). When sequentially searching for multiple patterns, it may be desirable, but not required, to ignore one or more data vectors previously identified as exhibiting a first pattern when subsequently searching for a second pattern. For instance, data vectors previously identified as exhibiting a random pattern may be ignored for a subsequent search for a trend pattern. In a similar manner, one or more data vectors identified as exhibiting the second pattern may be ignored when subsequently searching for a third pattern. Such configuration may be advantageous to increase processing speed, since each subsequent search may be limited to a smaller subset of data vectors associated with the previous search. In addition, such configuration may facilitate an initial "data cleansing procedure" to identify and remove from further consideration erroneous or spurious data contained in the multi-dimensional database (e.g., by identifying and subsequently ignoring data vectors exhibiting an outlier pattern or a step pattern). This "data cleansing procedure" may facilitate a subsequent search and identification of data vectors exhibiting a particular pattern of interest (e.g., a trend pattern or a periodic pattern).

Returning to FIG. 4, the next processing step shown is to indicate one or more patterns identified in the multi-dimensional database (step 404). In the present embodiment of the invention, a user-interface module (e.g., the user-interface module 122) may indicate one or more patterns that are identified in the multi-dimensional database. In addition, the user-interface module may indicate one or more data vectors that exhibit the one or more patterns that are identified. For instance, the user-interface module may indicate an outlier pattern as an identified pattern and that two data vectors comprising the multi-dimensional database exhibit this outlier pattern. For certain applications, the user-interface module may indicate one or more sub-patterns that are identified and may further indicate one or more data vectors that exhibit the one or more identified sub-patterns. As discussed previously. the user-interface module may provide reports or graphs to facilitate understanding by a user.

In addition to providing the functions discussed above, the user-interface module may allow a user to specify a variety of processing options used to identify one or more patterns in the multi-dimensional database. In the present embodiment of the invention, the user-interface module includes a third module (e.g., the third module 124) that may facilitate selecting, from various patterns that are defined, a subset of these patterns to be searched for in the multi-dimensional database. For certain applications, the third module may facilitate selecting one or more sub-patterns to be searched for in the multi-dimensional database. In the present embodiment of the invention, the third module also may facilitate selecting a search order when searching for multiple patterns or may facilitate specifying respective subsets of data vectors comprising the multi-dimensional database for which various statistical tests are to be applied. As discussed previously, more than one statistical test may be defined corresponding to a particular pattern, and the third module may facilitate selecting a subset of these statistical tests to be applied to data of the multi-dimensional database. If desired, the third module may facilitate specifying or adjusting the value of one or more of the parameters (e.g., $\alpha$, $\beta$, or $\gamma$) previously discussed in connection with the various statistical tests.

Figure 5:
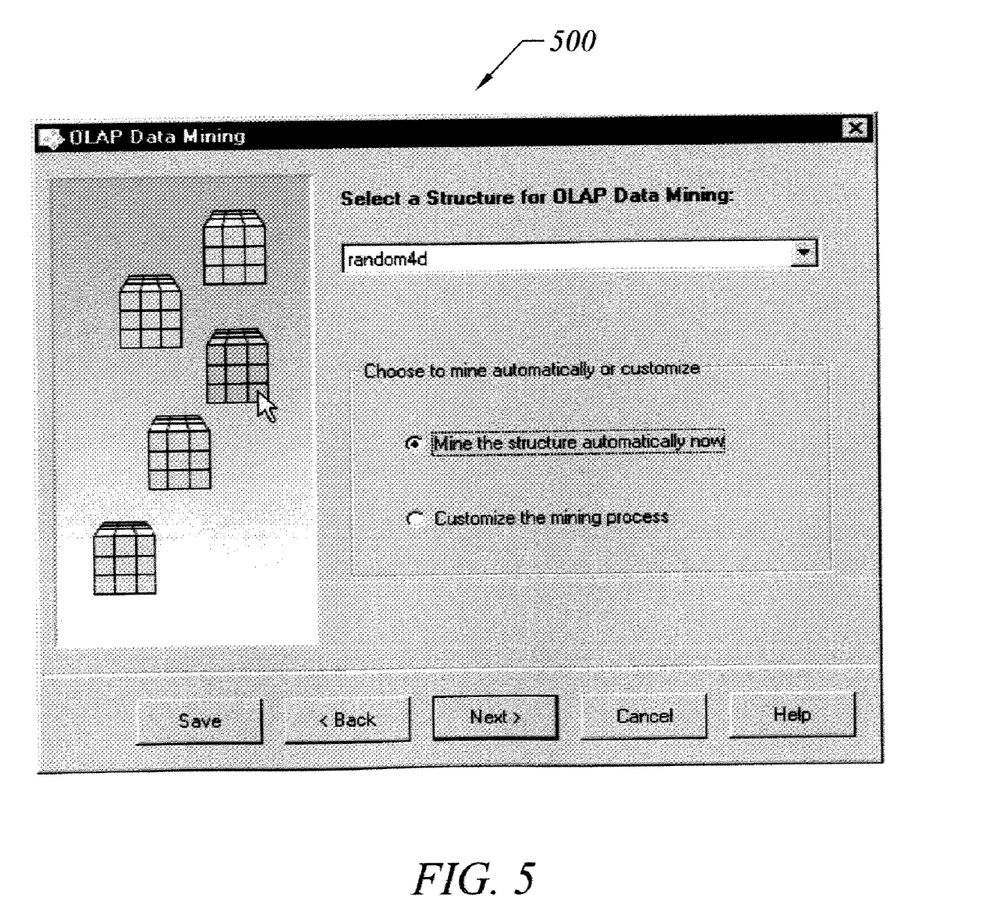
FIG. 5 illustrates a user-interface screen that indicates various OLAP data cubes comprising a multi-dimensional database in accordance with an embodiment of the invention.

With reference to FIGS. 5, 6, 7, and 8, various exemplary user-interface screens that may be provided by a user-interface module (e.g., the user-interface module 122) are shown, according to an exemplary embodiment of the invention. FIG. 5 illustrates a user-interface screen 500 that indicates various OLAP data cubes comprising a multi-dimensional database. A user can select one or more of these OLAP data cubes to be searched for patterns by, for example, a mouse click or keyboard selection. In a similar manner, one or more portions of a particular OLAP data cube may be selected. In the present embodiment, an OLAP data cube labeled as "random4d" is selected. This OLAP data cube has four dimensions (i.e., variable dimension, product dimension, region dimension, and period or time dimension) and contains data relating to various economic measures, for various products, for various regions, and at various times. Here, the variable dimension is associated with 5 variables that may relate to different economic measures such as, for example, sales, price, revenue, costs, and profit.

As shown in FIG. 5, the user-interface screen 500 indicates two options that may be used when searching for patterns in the OLAP data cube. The first option labeled as "Mine the structure automatically now" may be associated with certain default settings in accordance with the present embodiment of the invention. These default settings may relate to, for example, patterns to be searched (e.g., all patterns), data vectors to be searched (e.g., all data vectors), search order (e.g., outlier pattern first, step pattern second, random pattern third, trend pattern fourth, and periodic pattern fifth), statistical tests to be applied (e.g., Tukeys test for outlier pattern), values for parameters associated with the various statistical tests (e.g., $\alpha$ is set to 2.5), and so forth. The second option labeled as "Customize the mining process" allows a user to specify a variety of processing options used when searching for one or more patterns in the OLAP data cube. For instance, this second option may allow the user to change one or more of the default settings discussed above (e.g., $\alpha$ is set to 2 instead of 2.5).

Figure 6:
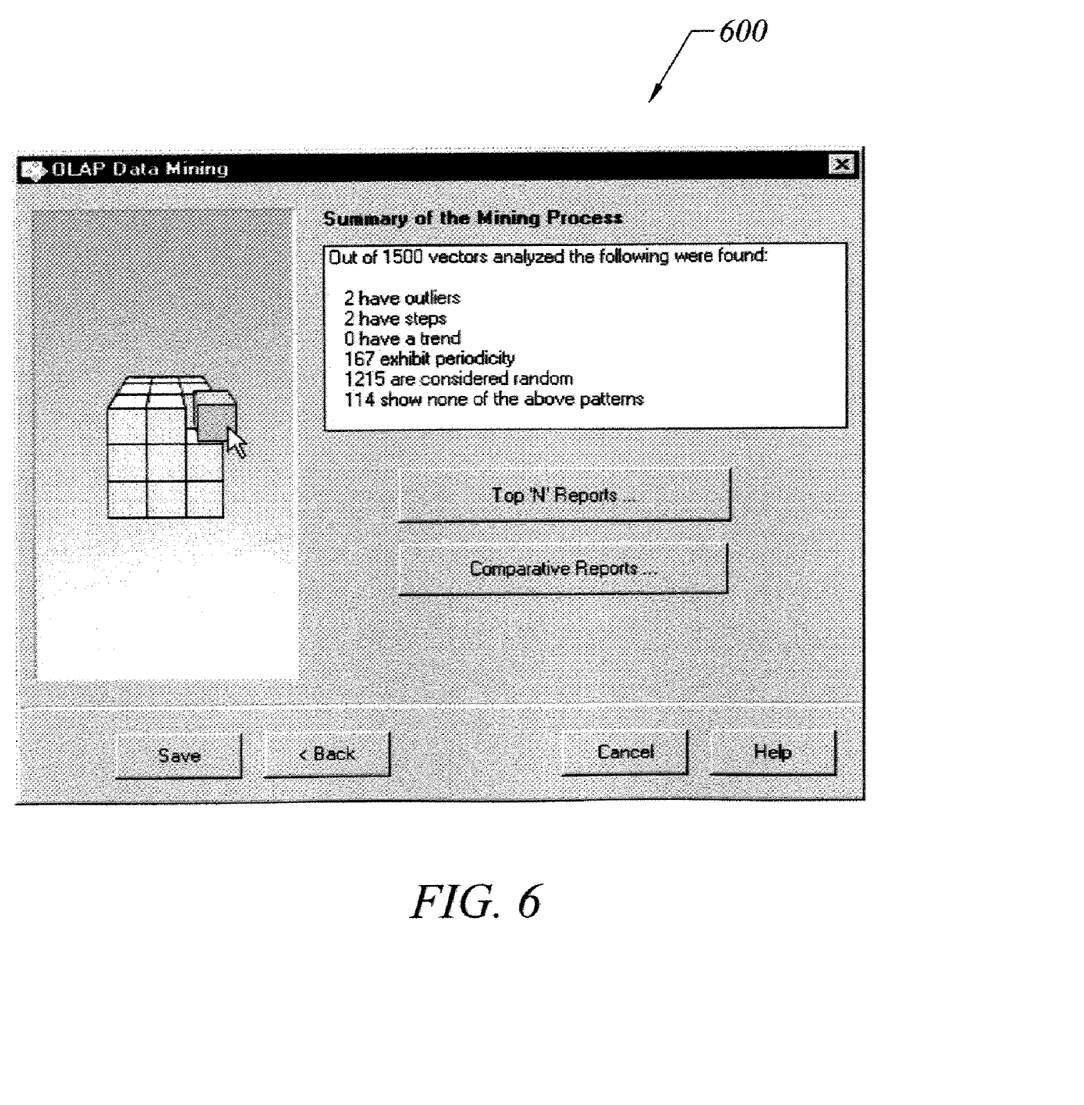
FIG. 6 illustrates a user-interface screen that provides a summary of results for various patterns that were searched in an OLAP data cube in accordance with an embodiment of the invention.

Turning next to FIG. 6, a user-interface screen 600 is shown that provides a summary of results for various patterns that were searched for in the OLAP data cube. In particular, the user-interface screen 600 indicates various patterns that have been identified and the number of data vectors found to exhibit each identified pattern. As shown in FIG. 6, the user-interface screen 600 indicates two options that may be used for further presenting results. The first option labeled as "Top 'N' Reports" may provide one or more ranked lists of data vectors corresponding to one or more identified patterns. A criteria used for ranking data vectors may be defined based on one or more statistical quantities previously discussed in connection with the various statistical tests. For instance, a ranked list of the two data vectors found to exhibit an outlier pattern may be provided, where the two data vectors may be ranked in accordance with a criteria such as, for example, number of outliers, extent of deviation of an outlier from a probable range of variation, and so forth. Also, a ranked list of the two data vectors found to exhibit a step pattern may be provided, where the two data vectors may be ranked in accordance with a criteria such as, for example, number of steps, length of a step, extent of deviation of an outlier in a transformed sequence from a probable range of variation, and so forth. The second option labeled as "Comparative Reports" may provide a list or a graphical representation of two or more data vectors to facilitate comparative analysis of data. An exemplary graphical representation that may be provided by this second option will be later discussed in connection with FIG. 8.

Figure 7:
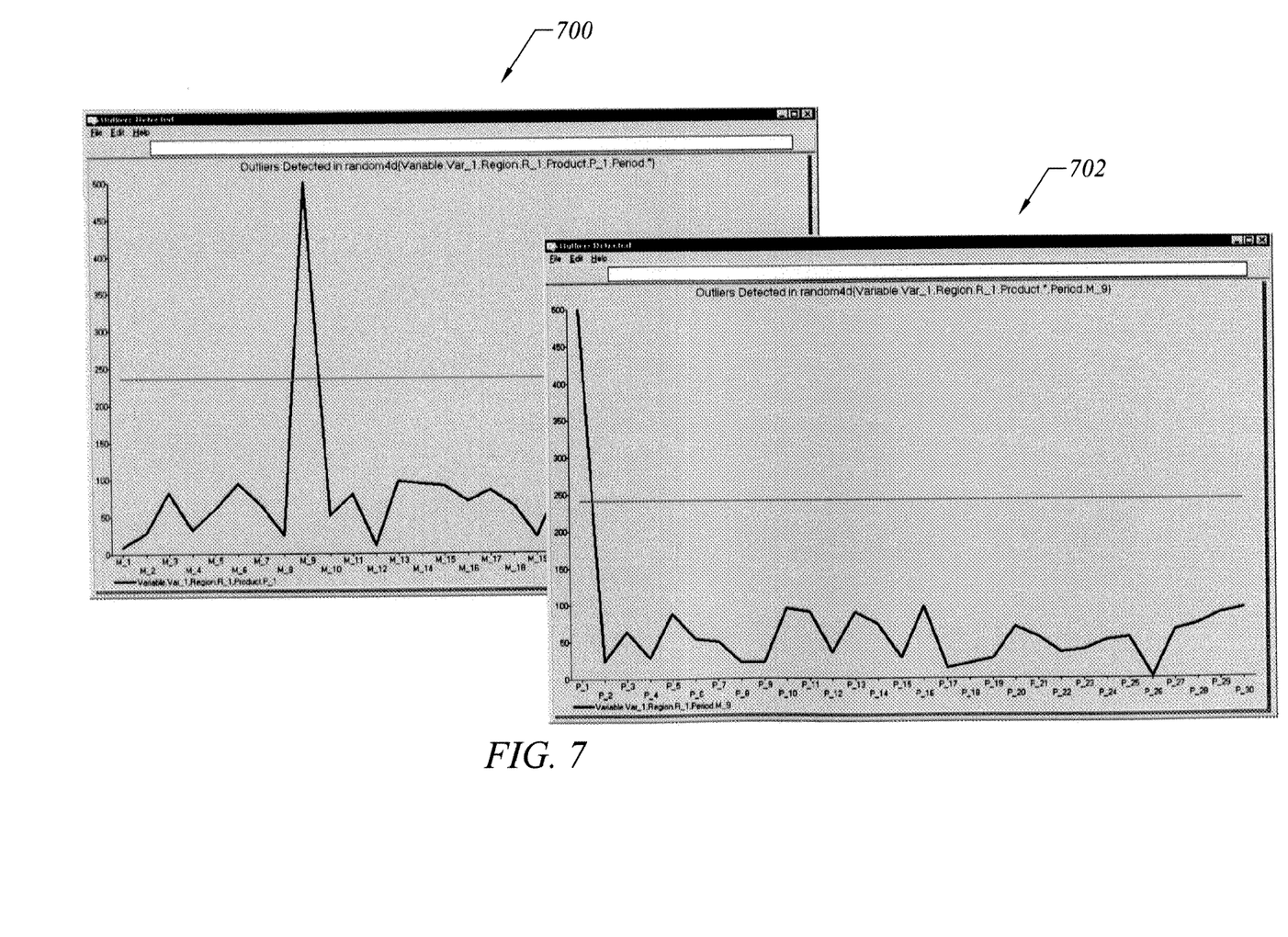
FIG. 7 illustrates two user-interface screens that provide graphical representations of two data vectors in accordance with an embodiment of the invention.

As shown in FIG. 6, two data vectors are identified as exhibiting an outlier pattern. In the present embodiment of the invention, the user-interface module may facilitate a more focused analysis of one or more of these data vectors. In particular, FIG. 7 illustrates user-interface screens 700 and 702 that provide graphical representations of these two data vectors. Each illustrated data vector is shown comprising a sequence of data values plotted along a particular dimension of the OLAP data cube. In addition, horizontal lines are shown to indicate upper boundaries for probable ranges of variation associated with the two data vectors.

Figure 8:
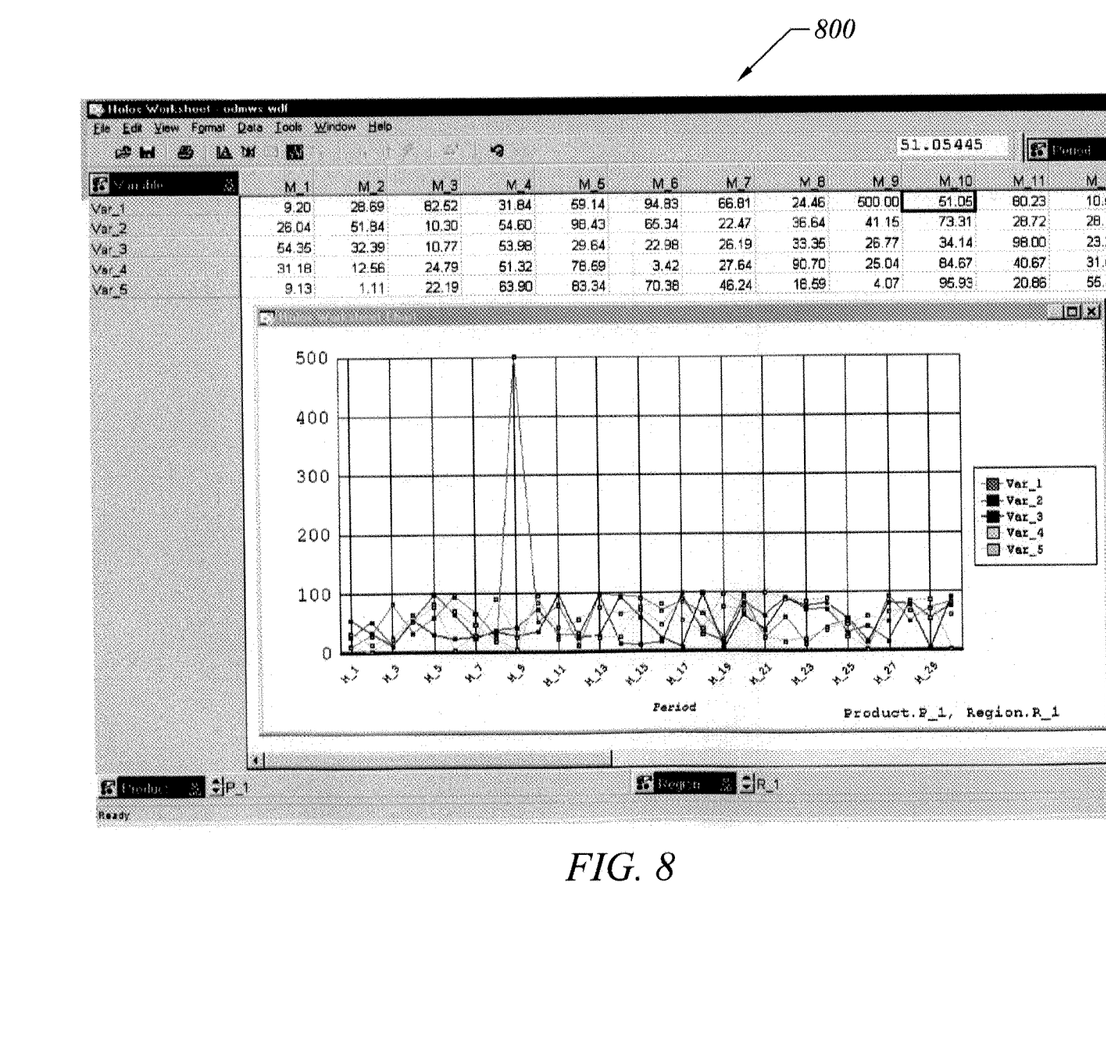
FIG. 8 illustrates a user-interface screen that provides a combined graphical representation of five data vectors in accordance with an embodiment of the invention.

FIG. 8 illustrates a user-interface screen 800 that provides a combined graphical representation of five data vectors that include the data vector separately shown by the user-interface screen 700. This combined graphical representation facilitates a comparative analysis of data and aids determination of whether an outlier represents erroneous data or a meaningful data spike. In the present embodiment of the invention, the user-interface screen 800 provides a list of data values comprising the five data vectors.

It should be recognized that the specific embodiments of the invention discussed above are merely exemplary, and various other embodiments are encompassed by the present invention.

For instance, an embodiment of the invention may include a help system, including a wizard that provides assistance to users, for configuring a computer (e.g., the computer 100) and its various components.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools.

Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A computer-readable storage medium, comprising executable instructions to:
    designate a plurality of patterns to apply to data within a multi-dimensional database, wherein the plurality of patterns include at least two different patterns selected from an outlier pattern, a step pattern, a random pattern, a trend pattern, and a periodic pattern; and
    apply a plurality of statistical tests corresponding to the plurality of patterns to data vectors of the multi-dimensional database to identify at least one pattern, wherein the plurality of statistical tests are selected from Tukey's test, a Standard Deviation test, a Runs test, an Autocorrelation test, a Mean Squared Successive Difference test, a Regression Analysis, and a Rank Correlation test.

2. The computer-readable storage medium of claim 1 further comprising executable instructions to display the at least one pattern.

3. A computer-implemented method, comprising:
    defining a plurality of statistical tests selected from Tukey's test, a Standard Deviation test, a Runs test, an Autocorrelation test, a Mean Squared Successive Difference test, a Regression Analysis, and a Rank Correlation test;
    applying, with a processor, the plurality of statistical tests to a plurality of data vectors of a multi-dimensional database stored in memory to identify a plurality of patterns including at least two different patterns selected from an outlier pattern, a step pattern, a random pattern, a trend pattern, and a periodic pattern; and
    displaying the plurality of patterns.

4. The computer-implemented method of claim 3, wherein the plurality of data vectors are oriented along a time dimension of the multi-dimensional database, and applying the plurality of statistical tests includes applying the plurality of statistical tests to the plurality of data vectors to identify the plurality of patterns with respect to the time dimension.

* * * * *